United States Patent [19]
Lucan

[11] B 3,952,812
[45] Apr. 27, 1976

[54] GARDEN TOOL
[76] Inventor: Joseph L. Lucan, 16 545 Armstead St., Granada Hills, Calif. 91344
[22] Filed: Aug. 28, 1972
[21] Appl. No.: 284,427
[44] Published under the Trial Voluntary Protest Program on January 28, 1975 as document no. B 284,427.

[52] U.S. Cl. ................................. 172/375; 306/22
[51] Int. Cl. ................................................. A01b 1/20
[58] Field of Search ............... 172/375, 371; 306/22

[56] References Cited
UNITED STATES PATENTS

| 120,143 | 10/1871 | Wright | 172/375 |
|---|---|---|---|
| 332,350 | 12/1885 | Kretsinger | 172/375 |
| 538,146 | 4/1895 | Bailey | 172/375 X |
| 1,148,534 | 8/1915 | Pringle | 172/375 |
| 1,557,894 | 10/1925 | Sturgis | 306/22 X |
| 2,040,751 | 5/1936 | Marseilles | 172/375 |
| 2,752,179 | 6/1956 | LeFebvre | 302/22 X |

FOREIGN PATENTS OR APPLICATIONS

| 247,625 | 8/1945 | France | 172/375 |

Primary Examiner—Stephen C. Pellegrino
Attorney, Agent, or Firm—Thomas D. Linton, Jr.

[57] ABSTRACT

This gardener's hand tool has a double-ended head at one end of a handle. One end edge of the head is beveled to form a cutting hoe-like blade and the other end is provided with spaced tines which are rounded in cross-section to form tapered wedge-shaped recesses for receiving and pulling weeds and roots. The handle is rigidly secured to the head and the latter is bent at two places to dispose the cutting blade and tines at a critical angle relative to the handle to secure the most efficient operation of the tool. A unique connection between the head and handle prevents the rotation in and/or separation of the latter from the head.

6 Claims, 6 Drawing Figures

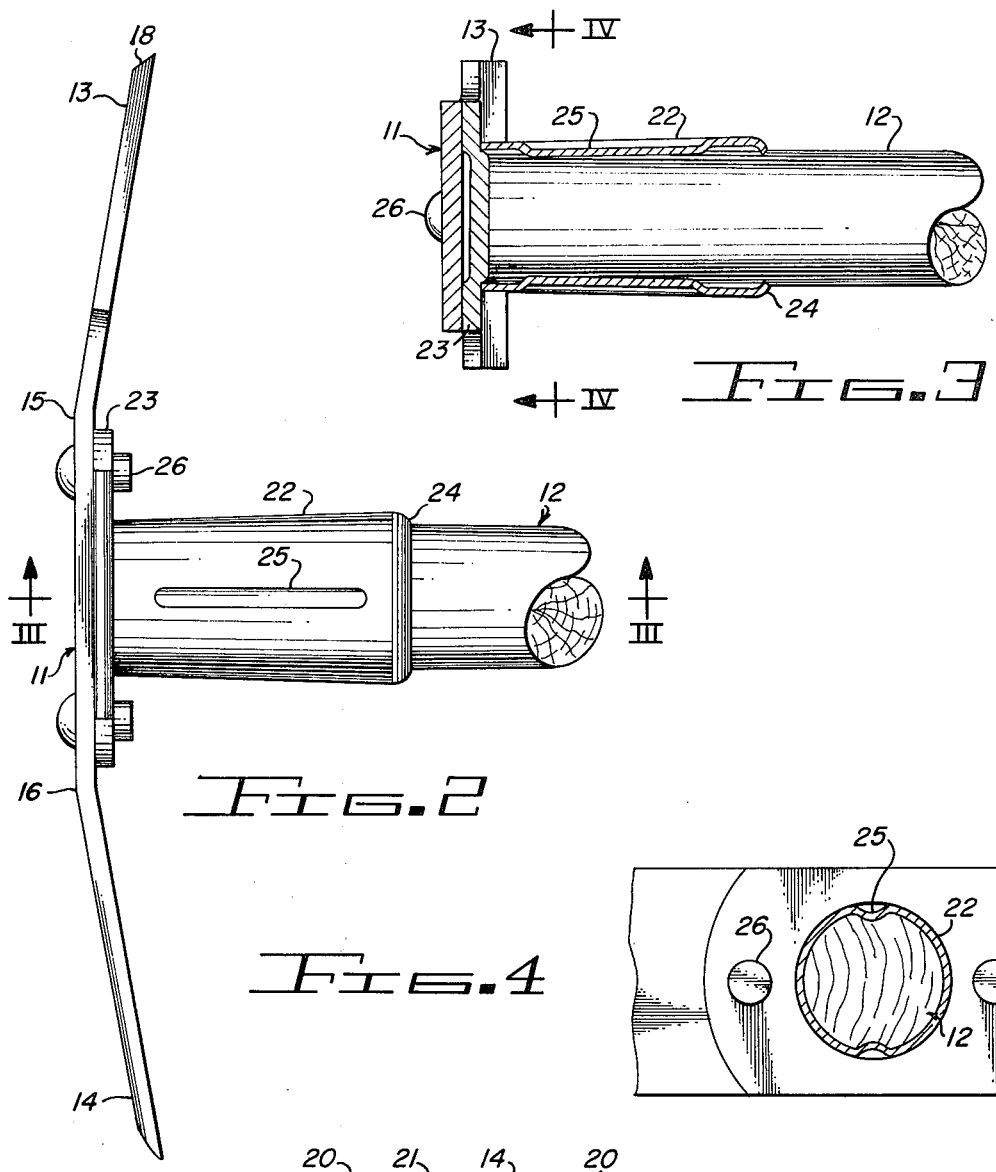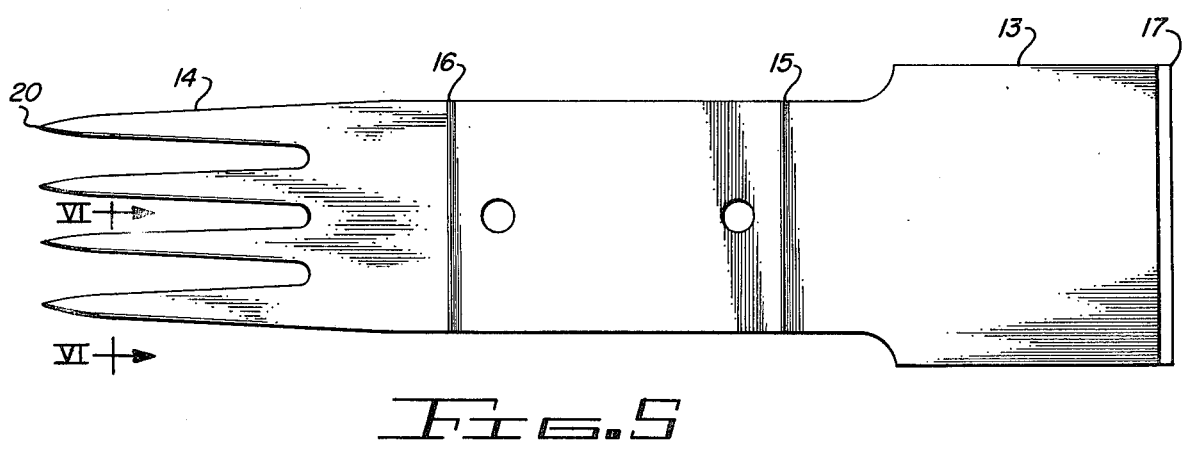

GARDEN TOOL

SUMMARY

This invention relates generally to agricultural implements and is more particularly directed to a hand tool for use by a gardener to remove weeds and cultivate growing plants.

More specifically the invention pertains to a hand wielded garden tool specifically designed to serve as a weed or root digger, cutter and puller. Still more specifically, the invention is directed to the provision of a hand tool which may be used with a striking force, as with a hammer, to penetrate the soil to the root of a weed, then inverted to engage another part of the tool with the root and pivoted as a lever to pry the weed out of the ground by the roots.

An object of the invention is to provide a gardener's hand tool having a double-ended head at one end of a handle, the head having a sharpened hoe-like blade at one end and a plurality of spaced pointed tines at the other end, the head being formed to dispose the blade and tines at the most appropriate angle relative to the handle to facilitate the most efficient use of the tool.

A further object of the invention is to provide the tines mentioned in the previous paragraph with a particular shape which renders the tool more adaptable to extracting heavily rooted weeds, such as Dandelion, Crab, Bermuda, Nut, and Johnson grasses, as well as many others from hard soil.

A still further object of the invention is to provide a unique manner of securing the head to the handle to prevent rotary movement therebetween and/or separation of one from the other to prolong the useful life of the tool.

Other objects and advantages of the invention will be obvious from, or particularly pointed out in, the following description of a hand tool for gardeners embodying the principles of the present invention and shown in the accompanying drawings.

IN THE DRAWINGS

FIG. 2 is a side elevational view of the tool shown in FIG. 1;

FIG. 3 is an axial sectional view taken through the tool at the connection between the head and handle on the plane indicated by the line III—III of FIG. 2;

FIG. 4 is a vertical cross sectional view taken through the handle and connecting means on the plane indicated by the line IV—IV of FIG. 3;

FIG. 5 is a front elevational view of the head of the tool; and

FIG. 6 is a detail sectional view taken on the plane indicated by the line VI—VI of FIG. 5.

DESCRIPTION

Figure 1:
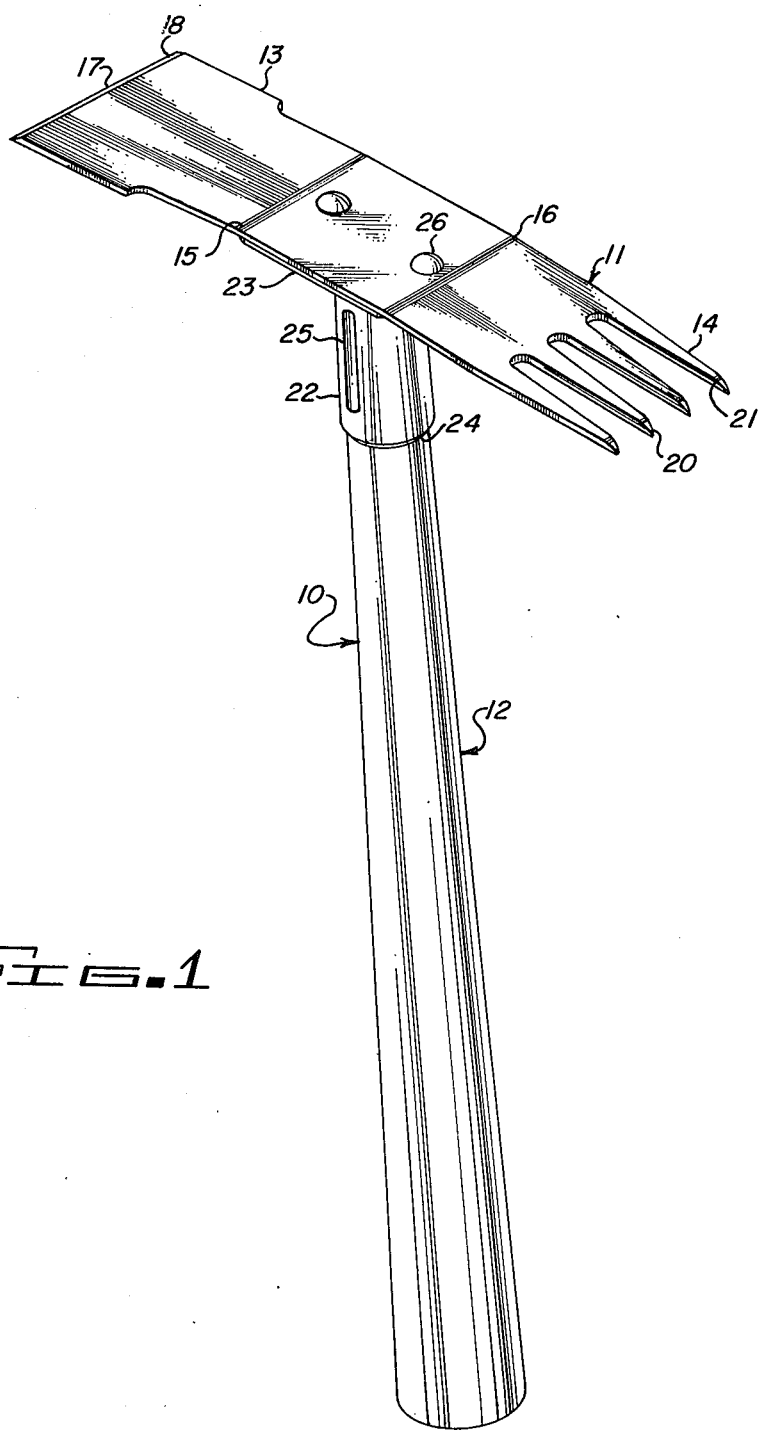
FIG. 1 is a perspective view of a Garden Tool formed in accordance with the present invention.

More particular reference to the drawings will disclose that the garden tool 10 of this invention is composed of two major parts, viz., a head 11 and a handle 12 rigidly secured thereto.

As shown in FIGS. 1, 2 and 5, the head is double ended, having a blade section 13 at one end and a forked or tined section 14 at the other end.

The head 11 may be cut or stamped from sheet or plate steel of suitable thickness and composition which may be heat treated to lend the desired hardness for sharpening and wearing qualities. As shown in FIG. 2 the head is formed, by bending at two spaced transversely extending lines 15 and 16, with an intermediate section between the sections 13 and 14. The handle 12 is affixed to the intermediate section and extends at right angles thereto. As indicated in FIG. 2 the bends at 15 and 16 dispose each of sections 13 and 14 at angles of substantially ten degrees to the plane of the intermediate section. Sections 13 and 14 are both inclined away from the surface of the intermediate section opposite that to which the handle is attached. This arrangement thus positions the blade and tined sections at the angle for most efficient operation of the tool.

The free edge 17 of the blade section 13 is ground on a bevel, as at 18, to provide a straight cutting edge to be used in severing roots or stems and branches of weeds and other plants. This section may also be used like a hoe in the cultivation of plants as desired.

As shown in FIGS. 5 and 6 the tined section 14 of the blade is provided with spaced tines 20 which in the illustrated embodiment are four in number. These tines have many purposes, but are primarily provided for the extracting or pulling of weeds by the roots. To facilitate this purpose the tines 20 are shaped to make the spaces therebetween tapered so that roots, stems, etc., may be wedged into and gripped by the tines. In addition, as shown more particularly in FIG. 6, the tines 20 are rounded and/or beveled, as at 21, to give the spaces between the tines a wedge-shaped cross-section. This shape adds to the ability of the tines to receive and grip roots, stems, twigs and the like during the use of the tool.

The head 11 and handle 12 are secured together in a unique manner which prevents relative rotary movement therebetween, as well as separation from one another. To attach the handle to the head, use is made of a slightly tapered ferrule 22 which has a flange 23 at the smaller end. The end of the handle is tapered to snugly fit the ferrule and at assembly is pressed thereinto. The end edge of the ferrule is then rolled or crimped into a reduced area of the handle, as at 24, to retain these elements together. At two diametrically opposed portions the ferrule is indented or pressed into the handle, as at 25, which effectively precludes turning or rotative movement of the handle in the ferrule. The ferrule, with the handle attached, is then secured to the head by rivets 26 extending through the head and flange 23, thus completing the tool.

From the foregoing it will be apparent that a novel garden tool has been provided. It is suitable for use as a weed puller and will extract the most difficult weeds from hard-to-work soil with the least amount of effort.

I claim:

1. A gardener's hand tool, comprising:
    a. a head member, said head member having a blade, intermediate and tine sections, said tine section including a plurality of tines, each of said tines being relieved on the under side of said tine so as to provide the space between said tines with a wedge-shaped cross-section;
    b. a handle, said handle being provided with a tapered configuration;
    c. a ferrule, said ferrule being provided with a tapered configuration and fitting over a portion of said handle and being firmly attached to said handle; and 1. a flange member attached to said ferrule, said flange member having one side attached to one end of said ferrule and the opposite side attached to the intermediate section of said head member so as thereby to attach said handle to said head member, said intermediate section and said flange member being disposed at an angle of substantially 90° to said handle, said blade section and said tine section being disposed on opposite sides of said intermediate section, said blade section and said tine section being disposed at a predetermined angle to said intermediate section.

2. A gardener's hand tool in accordance with claim 1 wherein said tine section is disposed at an angle of substantially 10° to said intermeiate section.

3. A gardener's hand tool in accordance with claim 1 wherein said blade section is disposed at an angle of substantially 10° to said intermediate section.

4. A gardener's hand tool in accordance with claim 1 wherein said blade section and said tine section are positioned to incline away from the same surface of said intermediate section, said blade section and said tine section being disposed at an angle of substantially 10° to said intermediate section.

5. A gardener's hand tool in accordance with claim 1 wherein said intermediate section and said flange member attached there to have substantially the same width and length.

6. A gardener's hand tool in accordance with claim 1 wherein the length of said intermediate section is substantially equal to the length of said blade section and the width of said intermediate section is substantially equal to the width of said tine section.

* * * * *